United States Patent [19]
Schilter

[11] 3,759,340
[45] Sept. 18, 1973

[54] AUTOMOTIVE VEHICLE WITH FRONT POWER TAKE-OFF FOR POWER-DRIVEN IMPLEMENTS

[75] Inventor: Thomas Schilter, Stans, Switzerland

[73] Assignee: Maschinenfabrik Schilter & Co., Stans, Switzerland

[22] Filed: Nov. 30, 1971

[21] Appl. No.: 203,333

[30] Foreign Application Priority Data
Dec. 2, 1970   Switzerland.................... 17806/70

[52] U.S. Cl. ........................... 180/53 FE, 180/44 R
[51] Int. Cl............................................. B60k 17/28
[58] Field of Search............. 180/44 R, 53 C, 53 D, 180/1 F, 1 R, 53 FE

[56] References Cited
UNITED STATES PATENTS

| | | | |
|---|---|---|---|
| 2,919,759 | 1/1960 | Wehsely.......................... | 180/53 FE |
| 2,829,723 | 4/1958 | Kelsey............................. | 180/53 D |
| 1,273,519 | 7/1918 | Millington....................... | 180/44 R |
| 1,340,759 | 5/1920 | Duncan............................ | 180/43 A |
| 2,855,063 | 10/1958 | Steinke et al...................... | 180/44 |
| 3,209,604 | 10/1965 | Mitchell et al................... | 180/53 FE |

*Primary Examiner*—Kenneth H. Betts
*Assistant Examiner*—J. M. McCormack
*Attorney*—Michael S. Striker

[57] ABSTRACT

An automotive vehicle wherein the engine block supports a plate for removable power-driven implements and a pivotable front axle whose housing serves as a means for journalling therein the rotary output element of a front power take-off for such implements. The input element of the power take-off receives torque from the output shaft of the engine in response to engagement of a clutch which connects the output shaft with the wheel transmission. The output element can be mounted in two coaxial trunnions of the front axle housing on in parallelism with the trunnions. Such mounting of the output element insures that the latter is invariably located at a predetermined distance from the torque-receiving input member of the implement which is mounted in front of the engine block.

16 Claims, 7 Drawing Figures

Patented Sept. 18, 1973 3,759,340

AUTOMOTIVE VEHICLE WITH FRONT POWER TAKE-OFF FOR POWER-DRIVEN IMPLEMENTS

BACKGROUND OF THE INVENTION

The present invention relates to automotive vehicles, such as tractors, and more particularly to improvements in automotive vehicles which are provided with a front power take-off serving to drive an auxiliary power-driven machine, such as an agricultural implement, a winch or the like.

Tractors which are used in agriculture are often provided with a front power take-off. Such tractors normally employ a front line axle whose rigid housing can pivot about a horizontal axis extending in parallelism with the longitudinal direction of the vehicle. The front axle is pivotably suspended on a bracket which is fixedly secured to the engine block or to the chassis. If the front end of the vehicle is to carry a prower-driven implement, it must be provided with a forwardly extending power take-off which transmits torque to the imput element of the implement when the latter is properly mounted in front of the front axle. The propeller shaft which drives the power take-off extends laterally of the engine block and must bypass the housing of the front axle, i.e., it must be mounted at a level above or below the front axle. Since the latter is free to pivot about a horizontal axis, which is parallel to the propeller shaft, such shaft must be mounted at a considerable distance above or below the housing of the front axle so as not to interfere with pivotal movements of the front axle when the vehicle travels on uneven terrain. The dimensions of tractors vary from type to type; therefore, various makes of tractors employ differently mounted front power take-off so that it was not possible to provide a standardized mounting for front power take-offs which would insure that a power-driven implement can be used on different makes of tractors without necessitating extensive adjustment of the support on which the implement is mounted. In other words, an implement which is properly mounted at the front end of a first tractor can be coupled to the front take-off of such first tractor but not to the front take-off a different second tractor.

SUMMARY OF THE INVENTION

An object of the invention is to provide a tractor or an analogous automotive vehicle with a novel and improved front take-off which is constructed and mounted in such a way that it does not interfere with movements of the front axle and can be readily coupled to anyone of a number of power-driven machines or implements which can be used with equal advantage on different makes of vehicles.

Another object of the invention is to provide an automotive vehicle with a front power take-off which is invariably located in a predetermined position with reference to the locus of connection of a power-driven machine or implement whose input element must receive torque from the power take-off.

A further object of the invention is to provide a novel and improved operative connection between the engine and the front power take-off of an automotive vehicle.

The invention is embodied in an automotive vehicle, such as a tractor, which comprises an engine having a rotary output member, a live or dead front axle which preferably comprises a rigid housing mounted in front of the engine for pivotal movement abut an axis which is parallel with the longitudinal direction of the vehicle, a plate or other suitable means for removably supporting power-driven implements in front of the axle, a front power take-off including a rotary output element journalled in and extending forwardly of the front axle so as to transmit torque to an implement which is properly secured to the supporting means and an input element for rotating the output element, for example, by way of a propeller shaft, and clutch means for connecting the output member of the engine with the input element of the front power take-off at the will of the operator. If desired, the aforementioned propeller shaft may constitute the output element of the front power take-off.

The novel features which are considered as characteristic of the invention are set forth in particular in the appended claims. The improved automotive vehicle itself, however, both as to its construction and its mode of operation together with additional features and advantages thereof, will be best understood upon perusal of the following detailed description of certain specific embodiments with reference to the accompanying drawing.

DESCRIPTION OF THE PREFERRED EMBODIMENTS

Figure 1:
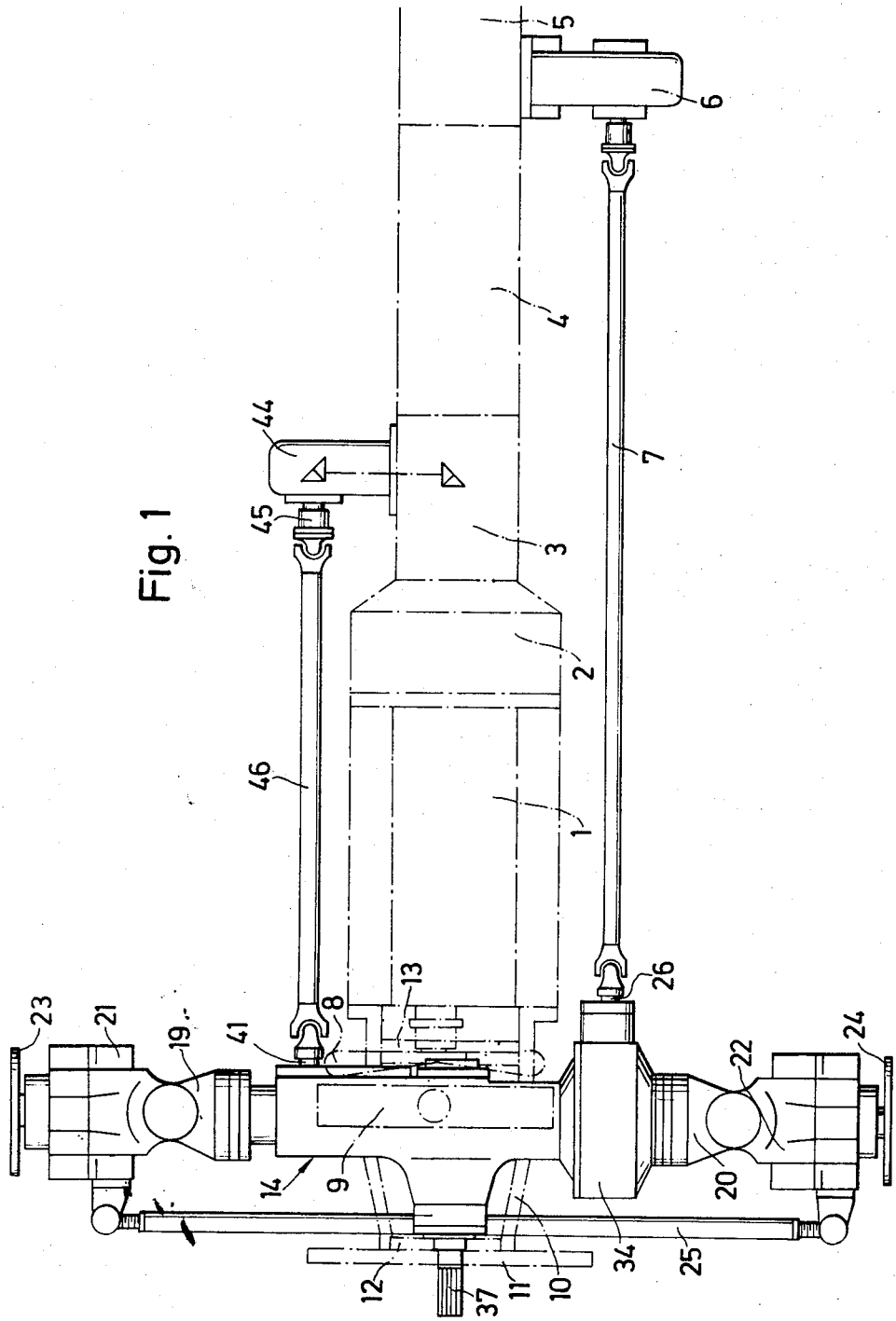
FIG. 1 is a diagrammatic fragmentary plan view of an automotive vehicle with a front power take-off which embodies one form of the invention.

Referring to the drawing in detail, there is shown a portion of an automotive vehicle, such as a tractor, which can be utilized to carry and operate one or more power-driven implements or machines, e.g., a snow thrower, a winch a power mover or the like. The chassis of the vehicle supports an engine block 1 located in front of a clutch housing 2 which in turn is located in front of an intermediate gearing 3. The gearing 3 is mounted in front of a transmission 4 which is located in front of the driving unit 5 for the rear axle or axles of the vehicle. The parts 1 to 5 consitute a self-supporting assembly. A front wheel power take-off 6 is mounted laterally on the driving unit 5 and its output element transmits torque to a propeller shaft 7 which drives a differential 29 in a housing 34 forming part of the rigid housing 14a of the front live axle 14 of the vehicle.

A fan 8 is located in front of the block 1 and is driven by the engine. This fan rotates behind a radiator 9 which is also supported by the block 1 or directly by the chassis of the vehicle. The block 1 is rigidly connected with a mounting means 10 for the housing 14a of the front live axle 14. The mounting means 10 comprises two transversely extending horizontal members or traverses 12 and 13 and a supporting plate 11 provided with holes or analogous locating means for bolts or similar fasteners which can secure to the plate 11 a power-driven implement (not shown), such as a power mower or a snow thrower.

Figure 2:
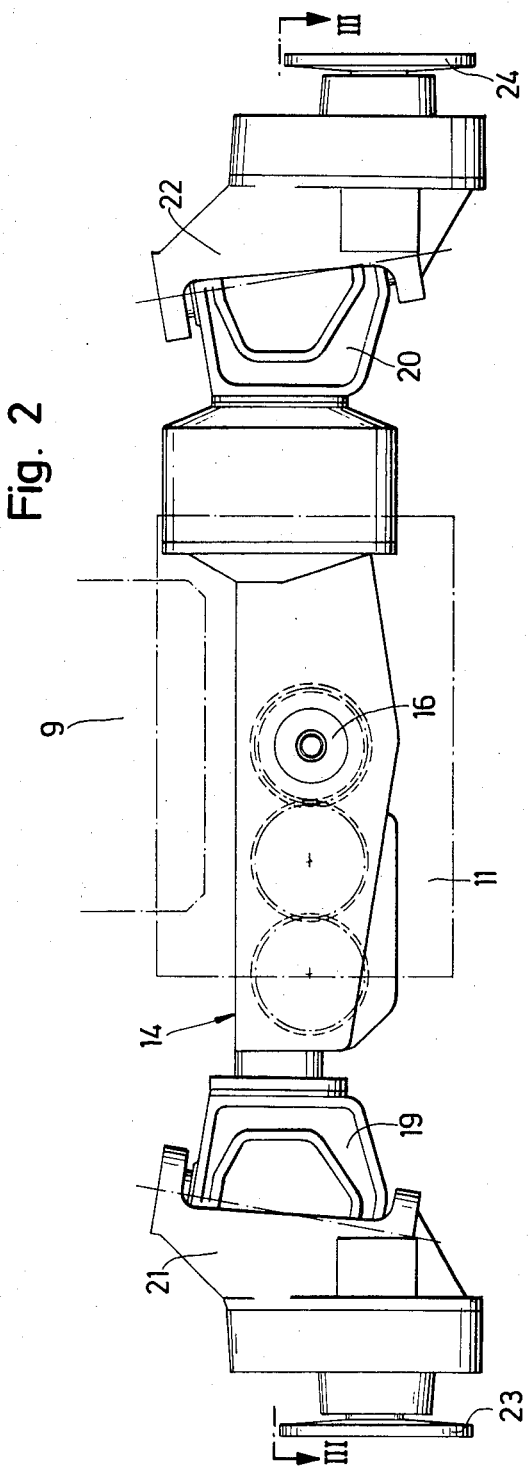
FIG. 2 is an enlarged fragmentary front elevational view of the vehicle as seen from the left-hand side of FIG. 1.
Figure 3:
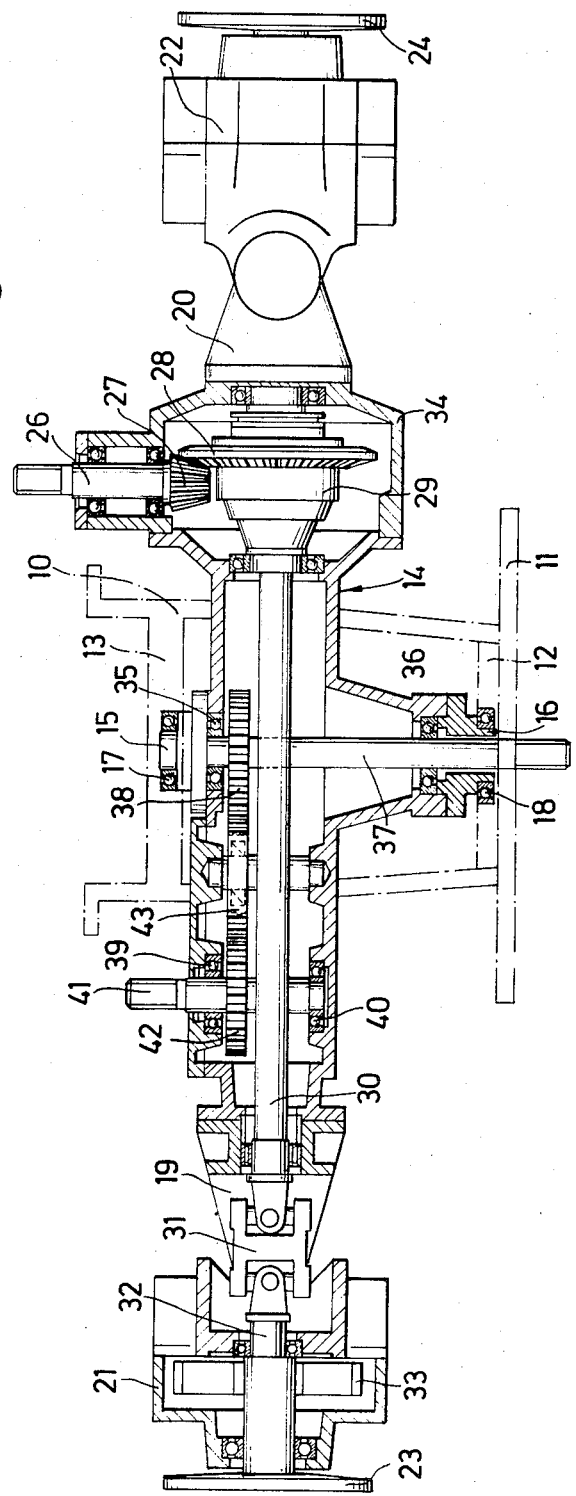
FIG. 3 is a horizontal sectional view as seen in the direction of arrows from the line III—III of FIG. 2.

As shown in FIGS. 2 and 3, the median portion of the housing 14a of the front live axle 14 is pivotable about a horizontal axis which extends in parallelism with the longitudinal direction of the vehicle. To this end, the rigid housing 14a of the rigid front axle 14 comprises two coaxial trunnions 15 and 16 which are rotatable in antifriction bearings 18, 17 respectively mounted in the traverses 12 and 13, see particularly FIG. 3. The aforementioned housing 34 for the differential 29 consitutes a rigid part of the housing 14a of the front axle 14. The ends 19, 20 of the housing 14a are articulately connected with forked casings 21, 22 for axle shafts 32 which rotate the wheel driving flanges 23, 24. The casings 21, 22 are coupled to each other by means of a tie rod 25.

The propeller shaft 7 drives a shaft 26 which is journalled in the housing 34 and carries a bevel drive pinion 27 (FIG. 3) in mesh with a bevel drive gear 28 of the differential 29. The gear 28 rotates a shaft 30 by way of gears in a case of the differential 29. The shaft 30 is rotatably journalled in the housing 14a of the front axle and rotates the shaft 32 by way of a universal joint 31. The shaft 32 drives a gearing 33 whose output shaft is rigid with the wheel driving flange 23. The other wheel driving flange 24 is rotated by the gear 28 in a manner analogous to that described for the flange 23, i.e., by way of a universal joint and a gearing in the forked casing 22.

The common axis of the aforementioned trunnions 15, 16 of the housing 14a is preferably located in the central vertical longitudinal symmetry plane of the vehicle. These trunnions are hollow and rotatably accommodate the output element 37 of a front power take-off 44. The output element 37 is rotatable in antifriction bearings 36, 37 of the housing 14a and carries a spur gear 38 which is also installed in the housing 14a of the front axle 14 and is keyed to the element 37. The gear 38 meshes with an intermediate gear 43 which receives torque from a further gear 42, both mounted in the housing 14a of the front axle 14. As shown in FIG. 3, the output element 37 of the front power take-off 44 is mounted at a level below the shaft 30 of the differential 29. The gear 42 is secured to a drive shaft 41 which is mounted in antifriction bearings 39, 40 supported by the housing 14a of the front axle 14. The shaft of the intermediate gear 43 is also rotatable in the housing 14a. The splined front end portion of the output element 37 extends forwardly beyond the supporting plate 11 and rotate the input member of a power-driven implement when the latter is properly mounted on the plate 11.

The front power take-off 44 is mounted laterally on the intermediate housing 3 and has an input element 45 which can drive the shaft 41 for the gear 42 by way of a propeller shaft 46 (see FIG. 1). The input element 45 can receive torque from the output shaft 1a of the engine in response to engagement of the clutch 2. Thus, when the clutch 2 is engaged, the input element 45 rotates the output element 37 by way of the shafts 46, 41 and gear train 42, 43, 38. It will be seen that the output shaft 1a of the engine can drive the output element 37 of the front power take-off 44 independently of the setting of the transmission 4. The output element 37 ceases to rotate in response to disengagement of the clutch 2.

Figure 4:
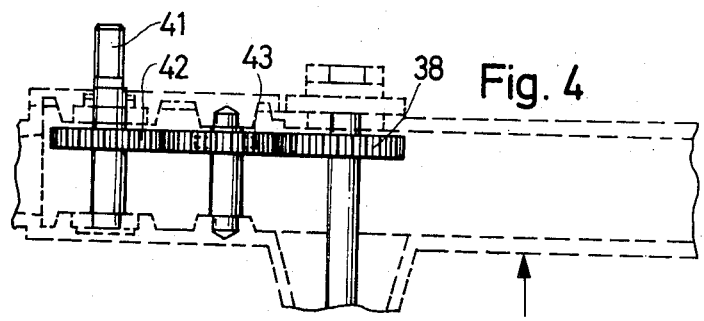
FIG. 4 is a fragmentary horizontal sectional view of a second embodiment.
Figure 5:
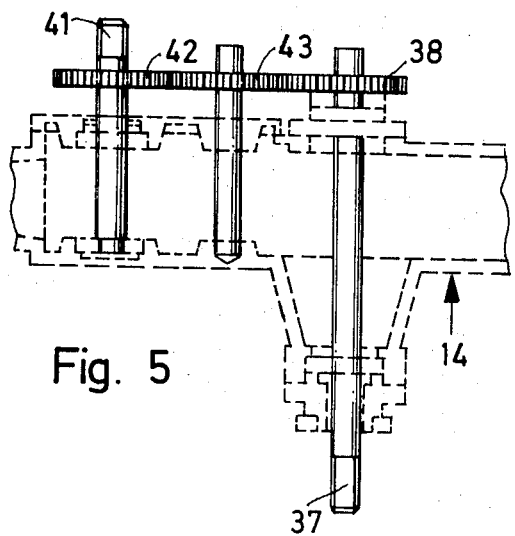
FIG. 5 is a fragmentary horizontal sectional view of a third embodiment.
Figure 6:
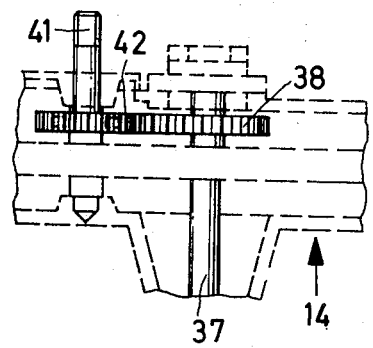
FIG. 6 is a fragmentary horizontal sectional view of a fourth embodiment.

It is clear that the invention can be embodied with equal advantage in vehicles wherein the front axle is a dead axle, i.e., without any means for positively driving the front wheels see FIG. 4. Thus, the power take-off 6 can be dispensed with and the front wheels which are attached to the flanges 23, 24, 38 then rotate merely in response to frictional engagement with the ground. It is further clear that the gear train 42, 43 need not be mounted in the housing 14a of the front axle 14 see FIG. 5 but can be accommodated in a discrete housing, not shown. Still further, the intermediate gear 43 of the gear train can be ommited see FIG. 6 if the gear 42 is mounted sufficiently close to the output element 37 so that it can mesh directly with the gear 38.

Figure 7:
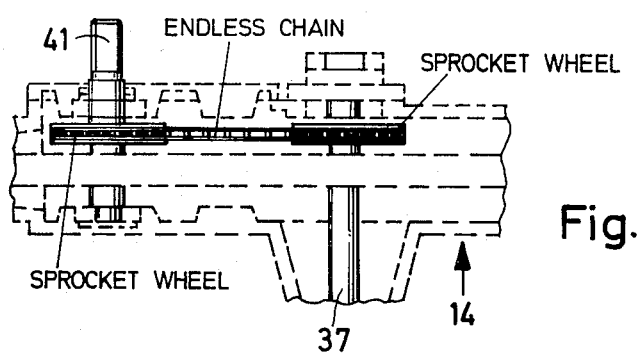
FIG. 7 is a fragmentary horizontal sectional view of a fifth embodiment.

It is also within the purview of the invention to omit the parts 41, 42, 43, 48, 37 of the front power take-off 44 and to extend the propeller shaft 46 forwardly beyond the housing of the front axle 14 so that its front end portion can perform the same torque-transmitting function as the splined front end portion of the output element 37. Still further, the intermediate gear 43 can be omitted and the gears 42, 38 replaced with sprocket wheels and a chain see FIG. 7 or an analogous endless flexible element which is trained over the sprocket wheels and rotates the output element 37 in response to rotation of the propeller shaft 46.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore such adaptations should and are intenteded to be comprehended within the meaning and range of equivalence of the claims.

What is claimed as new and desired to be protected by Letters Patent is set forth in the appended claims.

1. In an automotive vehicle, such as a tractor, a combination comprising an engine having a rotary output shaft; a front axle; a rotary output element journalled in said front axle and extending forwardly therefrom so as to be adapted to transmit torque to an implement in front of said front axle; a drive shaft journalled in said front axle, said rotary output element and said drive shaft extending parallel to each other and in the longitudinal direction of said vehicle; a propeller shaft operably connected at opposite ends to said rotary output shaft and said drive shaft, said drive shaft and said propeller shaft being located laterally of said engine; and transmission means mounted on said front axle for transmitting a drive from said drive shaft to said rotary output element.

2. A combination as defined in claim 1, and including means for removably supporting a power driven element in front of said front axle.

3. A combination as defined in claim 1, wherein said front axle is pivotable about an axis which is at least substantially parallel with the axis of said output element, and further comprising means for pivotably mounting said front axle in front of said engine.

4. A combination as defined in claim 1, wherein said front axle is rigid.

5. A combination as defined in claim 1, wherein said front axle is pivotable about the axis of said output element.

6. A combination as defined in claim 1, wherein said front axle comprises a pair of coaxial trunnions and further comprising means for pivotably mounting said trunnions in front of said engine, said output element being rotatable journalled in said trunnions.

7. A combination as defined in claim 1, wherein said front axle comprises a rigid housing and said output element is rotatably journalled in said housing.

8. A combination as defined in claim 1, wherein said transmission means for rotating said output element comprises sprocket wheels secured to said shaft and said output element and an endless chain trained over said sprocket wheels.

9. A combination as defined in claim 1, further comprising further transmission means arranged to rotate the wheels of the vehicle and receiving torque from said output member of said engine by way of said clutch means.

10. A combination as defined in claim 1, wherein said transmission means for rotating said output element comprises a gear train including gears mounted on said drive shaft and said output element.

11. A combination as defined in claim 10, wherein said gear train further comprises an intermediate gear meshing with said first mentioned gears.

12. A combination as defined in claim 10, wherein said gear train is mounted in said front axle.

13. A combination as defined in claim 1, wherein said front axle is a live axle including a housing and differential means mounted in said housing, said differential means including a first shaft located at a first level and said power take-off further comprising a second shaft interposed between said input element and said output element and located at a second level other than said first level.

14. A combination as defined in claim 13, wherein said output element is mounted between said differential means and said second shaft.

15. A combination as defined in claim 14, further comprising a pair of front wheel driving members and a gearing interposed between said first shaft and one of said front wheel driving members.

16. A combination as defined in claim 15, further comprising a casing articulately connected with said front axle and receiving said gearing.

* * * * *